Sept. 9, 1969
W. W. RIGROD
3,466,565
LASER MODE SELECTION
Filed Dec. 28, 1965
3 Sheets-Sheet 1
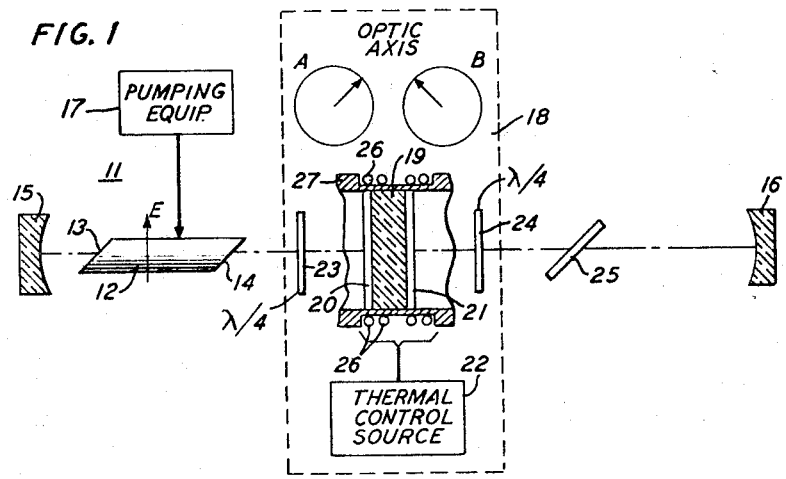
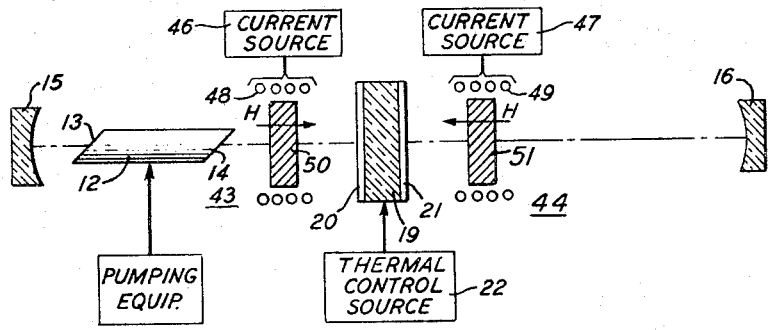
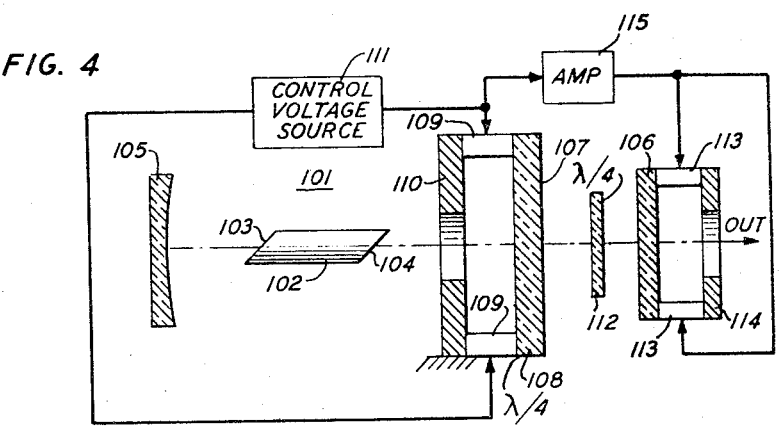
INVENTOR
W. W. RIGROD
BY *Wilford L. Wiener*
ATTORNEY

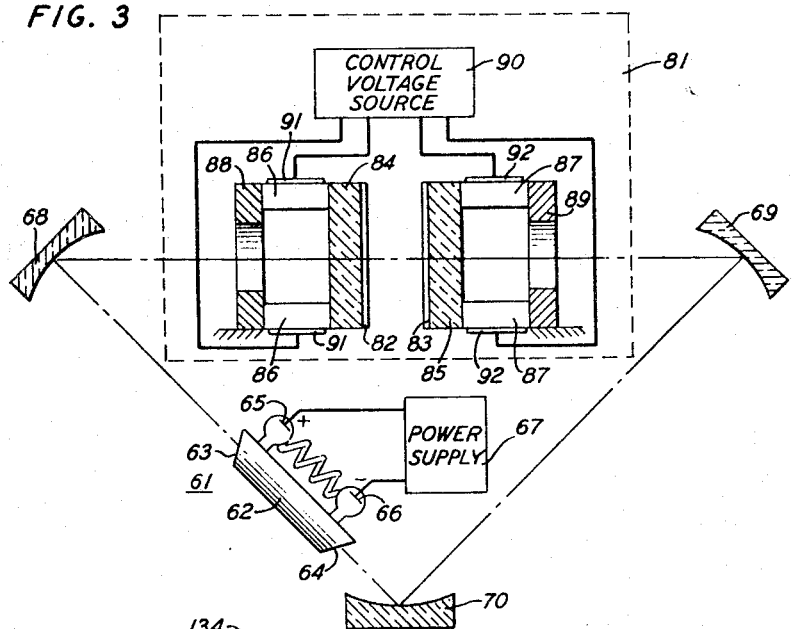
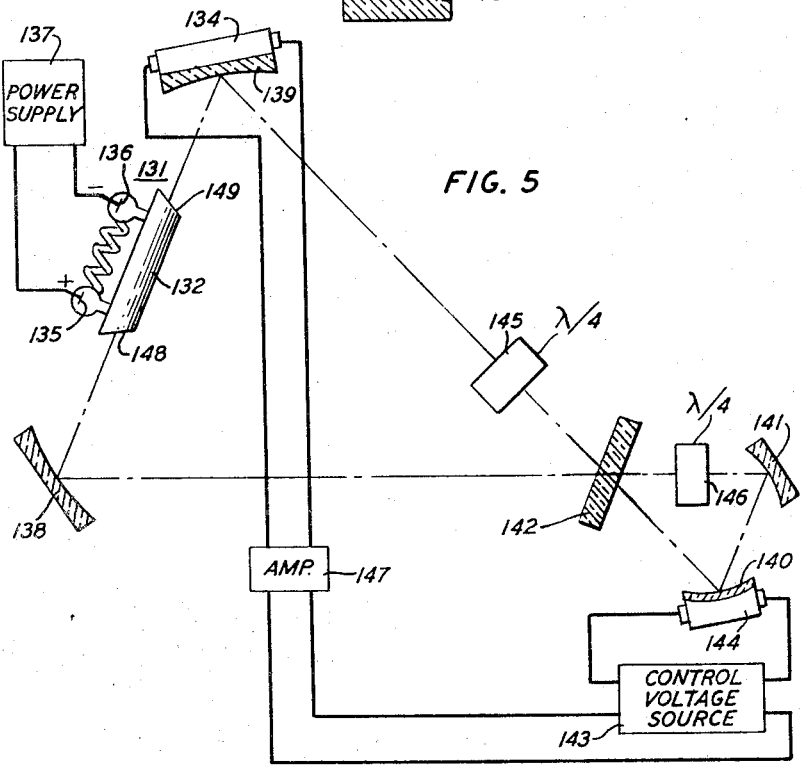

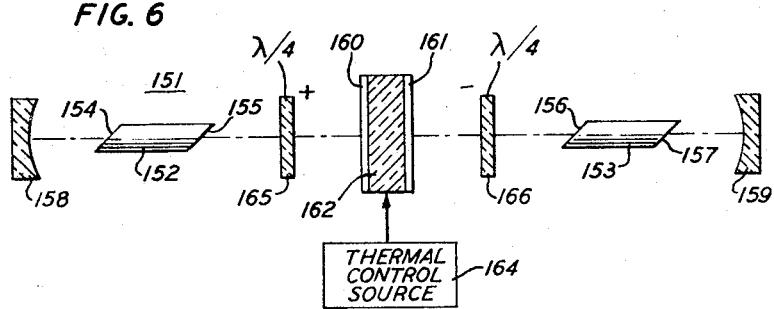
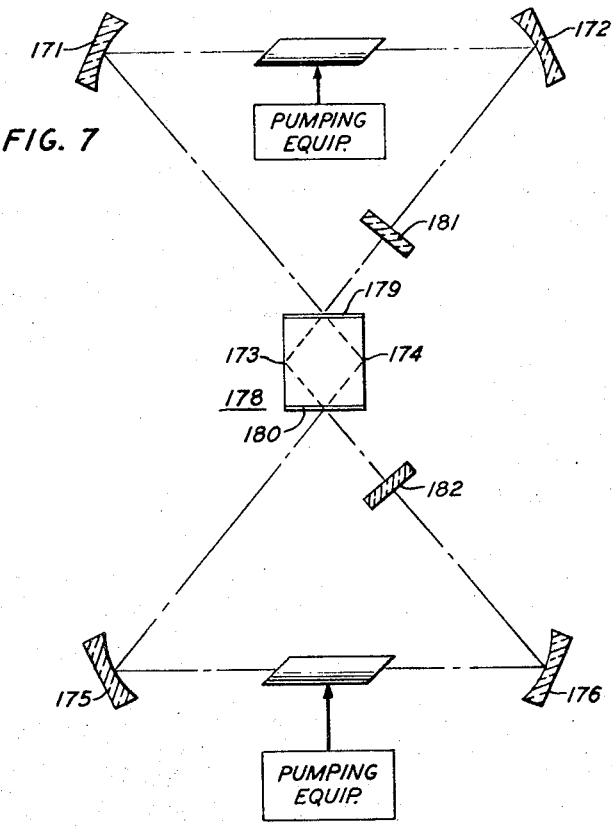

3,466,565
LASER MODE SELECTION
William W. Rigrod, Millington, N.J., assignor to Bell Telephone Laboratories, Incorporated, New York, N.Y., a corporation of New York
Filed Dec. 28, 1965, Ser. No. 516,867
Int. Cl. H01s 3/10
U.S. Cl. 331—94.5
17 Claims

ABSTRACT OF THE DISCLOSURE

Axial-mode-selective lasers are disclosed in which a relatively small secondary resonator tuned to a desired mode is disposed within the primary laser resonator and is oriented to have its axis aligned with the axis of the primary resonator. Unwanted modes are selectively suppressed by placing polarization transformers along the aligned axes in mutually compensating orientations with respect to the desired mode. The polarization transformer positions are chosen to subject some unwanted modes to cumulative polarization transformation in one of the polarization transformers and the rest of the unwanted modes to cumulative polarization transformation in the other transformer. The unwanted modes are then removed from the resonators by a loss mechanism such as a polarizing element or multiple reflections in the absence of any gain.

Both linear resonator embodiments and ring resonator embodiments are disclosed.

---

This invention relates to mode selection in laser resonators.

The term "laser" is an acronym for light amplification by the stimulated emission of radiation. A laser typically includes an active medium that has a pair of energy levels between which the lasing action occurs. The frequency of radiation corresponding to this pair of levels lies within a band called the line width of the transition, which may be much broader than the natural line width, due to Doppler broadening. A laser oscillator further includes a resonator formed by a pair of reflecting elements spaced apart so that at least one frequency lying in the natural line width can be resonated in the resonator. In order to obtain oscillations with a generally useful output power level, the length of active material and its gain coefficient must be so great than the smallest possible spacing of the reflecting elements still permits oscillations at a plurality of frequencies within the natural line width. These frequencies correspond to different axial modes of oscillation. Nevertheless, the output power at any one frequency is greatest and is most useful when oscillation occurs only at that one frequency.

Therefore, it is desirable to select a particular frequency or axial mode that is permitted to oscillate.

Many different techniques have been proposed for axial mode selection. Among these are the addition of reflectors outside the primary resonator to increase the losses for all modes except one. In order to achieve this result, such techniques also tend to provide an undesirably high attenuation for the desired mode.

Another technique for axial mode selection involves the employment of a tilted etalon, that is, a very small secondary resonator, within the primary resonator. Because its free spectral range, the frequency spacing between its resonant axial modes, is so much larger than that of the primary resonator, its mode selectivity can be made sufficiently sharp to permit to be made highly transmissive to the desired mode only, thereby discriminating much more strongly against other unwanted modes than the previously described techniques.

Nevertheless, its position within the primary resonator creates two side, or incidental, resonators in one of which the active medium appears. To prevent unwanted oscillations in this side resonator, it has been considered necessary to tilt the secondary resonator or etalon to increase the so-called "walk-off" losses for the unwanted oscillations. Unfortunately, this adjustment has the property of greatly broadening the beam width of the desired mode and increasing its "walk-off" losses within the primary resonator because the desired mode must be resonated at a small angle to the axis of the secondary resonator. Different portions of the desired mode pass from the secondary resonator after different numbers of passes therein and at different positions with respect to the axis of the primary resonator. Upon reflection by the mirror of the primary resonator, only a fraction of the total beam is returned to the laser, thereby failing to utilize the active medium fully. The gain for the desired mode is usually marginal; and frequently, oscillations may die out. Moreover, the "walk-off" losses for the desired mode increase with resonator length, thereby preventing the increase in gain that is the purpose of lengthening the resonator and the active medium.

Therefore, an object of my invention is a mode selection arrangement with relatively low losses for the desired mode, a laser resonator of any desired length, and the sharp discrimination against unwanted modes that is provided by a secondary resonator within the primary resonator.

My invention resides in my recognition that a single axial mode may be efficiently obtained in a primary laser resonator of any desired length by disposing a secondary, partially transmissive resonator or etalon therein with its resonance axis aligned with the resonance axis of the primary resonator and by disposing polarization transformers along the resonance axes in mutually compensating orientations with respect to radiation that is simultaneously resonant in the primary resonator and the secondary resonator. Radiation reflected back and forth through only one of the polarization transformers is transformed cumulatively and is suppressed by a polarizing element.

In two different species of the invention, the polarization transformers may be optical quarter-wave plates or Faraday rotators each adapted to produce 45° of Faraday rotation. Moreover, in some of the embodiments, the polarization transformers appear on opposite sides of the secondary resonator; whereas in others of the embodiments, one polarization transformer appears between the secondary resonator and the active medium, and the other polarization transformer appears within the secondary resonator. In either type the invention is applicable to both linear resonators and to ring resonators.

A more complete understanding of my invention will be obtained from the following detailed description, taken together with the drawing, in which:

FIG. 1 is a partially pictorial and partially block diagrammatic showing of the preferred embodiment of the invention;

FIG. 2 is a modification of the embodiment of FIG. 1 employing Faraday rotation in the polarization transformers;

FIG. 3 is a partially pictorial and partially block diagrammatic showing of a preferred embodiment of the invention particularly as applied to ring resonators;

FIG. 4 is a partially pictorial and partially block diagrammatic showing of another embodiment of the invention employing one of the polarization transformers within the second resonator;

FIG. 5 is a modification of the embodiment of FIG. 4 as applied to ring resonators;

FIG. 6 is a partially pictorial and partially block diagrammatic showing of an embodiment of the invention employing multiple sections of the actvie medium; and FIG. 7 is a modification of the embodiment of FIG. 6 as applied to ring resonators.

In FIG. 1 a laser 11 includes the tube 12 containing the active medium and having Brewster-angle windows 13 and 14, the pumping equipment 17, the primary resonator including the near confocal reflectors 15 and 16 and a mode selector 18 according to the present invention. Optionally, the polarization selecting device 25, which is illustratively a glass plate disposed at the Brewster-angle, may be inserted beween mode selector 18 and reflector 16 to provide a function similar to that provided by Brewster-angle windows 13 and 14 of tube 12.

The mode selector 18 includes the secondary resonator of etalon 19, which includes a transmissive dielectric material that is thermally tunable in response to thermal control source 22 and includes the planar or spherical reflectors 20 and 21 the normals to which are parallel to the resonator axis defined by the reflectors 15 and 16. The mode selector 18 further includes the polarization transformers 23 and 24, which are optical quarter-wave plates disposed on opposite sides of the etalon 19 and have their respective optic axes oriented parallel to mutually orthogonal polarization components of the selected mode. Each component is at a 45° angle with respect to the resultant (vertical) polarization, as indicated in vector diagrams A and B which represent the orientations of the optic axes of quarter-wave plates 23 and 24 viewed in a common direction along the primary and secondary resonator axes. Quarter-wave plates 23 and 24 are thus oriented to provide opposite senses of relative phase retardation for radiation propagated through the etalon 19.

Laser 11 may employ an argon ion active medium of the type disclosed in the copending application of E. I. Gordon et al., Serial No. 439,657, filed Mar. 15, 1965 and assigned to the assigneee hereof. Moreover, pumping equipment 17 typically is apparatus providing a direct current discharge, as disclosed therein. The length of the tube 12 is preferably at least 100 centimeters and the spacing between reflectors 15 and 16 at least 150 centimeters.

The dielectric material of etalon 19 in mode selector 18 is fused silica one-half inch thick with an index of refraction of 1.463 at 4900 A. units. The choice of one-half inch thickness of etalon 19 between reflectors 20 and 21 provides that the free spectral range of etalon 19 is substantially greater than the natural line width of the laser active medium, or at least exceeds the entire oscillation bandwidth of the laser active medium within the primary resonator 15, 16. The passband of etalon 19 can be made less than the free spectral range $C/2L$ of primary resonator 15, 16 by suitable reflective coatings 20, 21.

Thermal control source 22 is illustratively an electrical power source connected to a noninductive heating coil 26 embedded in a copper jacket 27 extending substantially beyond the major faces of and encompassing etalon 19 in such a fashion as not to interfere with the beam of radiation, and to control the length of etalon 19 by thermal expansion and contraction.

Although the reflectors 20 and 21 may be planar when the etalon 19 is disposed at the waist of the confocal laser beam, they may also be curved to conform more exactly to the surface of constant phase of the laser radiation with which they are most nearly coincident. Such conforming curvature of reflectors 20 and 21 would permit the etalon 19 to be disposed along the laser axis at a point other than the waist of the laser beam.

In the operation of the embodiment of FIG. 1, the pass band $\Delta f$, of etalon 19 equals 80 megacycles per second. The oscillation bandwidth $\Delta f$, of the laser is 6000 megacycles per second, the free spectral range $C/2L$ of the primary laser resonator with 150 centimeters between reflectors 15 and 16 is 100 megacycles per second and the free spectral range of the etalon 19 is greater than 6000 megacycles per second. The reflective coatings 20 and 21 of etalon 19 have transmittances for the desired mode of approximately 0.03.

As a result of the above specified transmittances etalon 19 has a relatively high Q so that the desired mode of radiation which is resonant simultaneously in etalon 19 and in the primary resonator tends to build up to an intensity level that is many times greater within etalon 19 than outside etalon 19. In this situation the etalon 19 is a good transmission device for the desired mode; and the desired mode will have approximately equal intensities on both sides of etalon 19.

Other modes not simultaneously resonant in etalon 19 and the pirmary resonator will tend to be predominately reflected at the external side of reflective coating 20 or the reflective coating 21. Since etalon 19 has its resonance axis aligned with the resonance axis of primary resonator, the undesired modes still propagate along the axis of the primary resonator.

For example, a mode that tends to be resonant in the side resonator defined by reflectors 15 and 20 will be polarized by the Brewster-angle windows 13 and 14 to have an electric field polarization in the plane of the paper as indicated. Upon propagating to the right through quarter-wave plate 23 this mode suffers a quarter-wave relative phase delay between orthogonal components of its polarization both of which are at 45° to the polarization passed by Brewster-angle windows 13 and 14. When quarter-wave plate 23 has its polarization axis oriented as shown at 45° with respect to the polarization passed by windows 13 and 14, the two orthogonal components of that polarization will be equal in ampltiude so that polarization of a mode at reflector 20 is circular. The undesired mode is not resonant in etalon 19 and is reflected by reflector 20 back through quarter-wave plate 23. Since both components of this circularly polarized wave suffer the usual 180° phase shift upon reflection, their relative phase remains the same as before; and their relationship to the optic axis of quarter-wave plate 23 remains the same as before. Therefore, as the undesired mode traverses the same quarter-wave retardation plate once more, the relative phase shift of its components is increased to 180° with the result that the polarization of the undesired mode emerging from quarter-wave plate 23 and propagating to the left toward Brewster-angle window 14 is horizointal. This polarization is not passed by Brewster-angle window 14. Therefore, this mode of radiation tends to be suppressed.

Similarly, an undesired mode of radiation which tends to be resonant in the side resonator defined by reflectors 21 and 16 also has its polarization rotated by 90° for every two passes through the quarter-wave plate 24 and is suppressed either by Brewster-angle plate 25 or dies out because of the lack of an active medium in this side resonator.

Nevertheless, the desired mode of radiation will always pass through lasser tube 12 with the polarization that is readily passed by Brewster-angle windows 13 and 14. Specifically, upon passing to the right through quarter-wave plate 23 it becomes circularly polarized as described above. This desired mode passes through etalon 19 as described above and is incident upon quarter-wave plate 24 with its components that are respectively parallel and orthogonal to the optic axis of quarter-wave plate 24 experiencing a relative phase shift opposite to that experienced in quarter-wave plate 23. Therefore, the desired mode of radiation propagating to the right toward reflector 16 has the vertical linear polarization that is readily passed through Brewster-angle plate 25. Upon being reflected by reflector 16 back through mode selector 18, the desired mode again has a vertical polarization when incident upon Brewster-angle windows 13 and 14. Therefore, this mode will tend to build up and consume all of the available power of the active medium at the expense of the modes that tend to be suppressed.

Since the mode that is permitted to build up must be simultaneously resonant in the primary resonator 15, 16 and the secondary resonator or etalon 19, it is apparent that one can select one among the many modes resonant in the primary resonator 15, 16 by tuning the etalon 19, for example, by changing the environmental temperature of the fused silica dielectric therein. Changing the temperature within the thermal enclosure 27 effectively changes the spacing between reflectors 20 and 21 and changes the resonant frequency of etalon 19. Variation of the temperature of etalon 19 is achieved in response to a signal from control source 22 applied to the heating coil 26.

It should be apparent that in place of the thermal tuning control disclosed in the embodiment of FIG. 1 the reflectors 20 and 21 could be separated by vacuum or a gas and could be tuned by being mounted upon electrically controlled piezoelectric mounts. One example of such tuning will be described hereinafter in connection with FIG. 3. Alternatively, the secondary resonator 19 could be tuned by any other method for changing the optical path length, $nh$, between reflectors 20 and 21, where $n$ is the index of refraction of the intervening material and $h$ is the spacing of reflectors 20 and 21. If a gas is employed between reflectors 20 and 21, the optical path length may be changed by varying the gas density, for example, by changing its pressure.

As another alternative, reflectors 20 and 21 may be thin metallic films disposed on a linear electro-optic material such as a KDP (potassium dihydrogen phosphate) crystal with one principal axis aligned with the plane of light polarization, and its optic axis with the laser axis, and having annular electrodes thereon through which the light can pass and which apply the electric field to the crystal in a direction parallel to the laser axis. Such a control voltage would change the optical path length primarily by changing the refractive index of the KDP crystal for the light wave.

Moreover, quarter-wave plates 23 and 24 could be replaced by Fresnel rhombs, which provide 45° of relative phase shift between mutually orthogonal components of each mode at each internal reflection, two internal reflections occurring during each pass through the rhomb.

Still another modification of the embodiment of FIG. 1 is illustrated in FIG. 2. In the embodiment of FIG. 2 the polarization transformers are the Faraday rotators 43 and 44, which are adapted to produce 45° of rotation of linear polarization but in opposite senses for radiations resonant simultaneously in the primary resonator 15, 16 and the etalon 19. Such radiations pass through rotator 43, etalon 19 and rotator 44 in tandem.

In order to achieve the Faraday rotation in opposite senses, current sources 46 and 47 apply currents to the coils 48 and 49 respectively to produce magnetic fields respectively directed in opposite directions along axes of the primary and secondary resonators. The active materials 50 and 51 of the Faraday rotators may be any type known in the art, for example, chromium tribromide employed as described in the copending application of J. F. Dillon, Jr., Ser. No. 206,102, now U.S. Patent No. 3,245,314 filed June 28, 1962, and assigned to the assignee hereof.

The primary difference between the embodiment of FIG. 2 and the embodiment of FIG. 1 is that the polarizations of all modes are still linear at the reflectors 20 and 21. Nevertheless, the polarization of the desired mode at Brewster-angle windows 13 and 14 is always such that it will pass through these windows; and the polarizations of the undesired modes at these windows are always orthogonal to the polarization most readily passed by windows 13 and 14, so that the undesired modes tend to be suppressed. Also, in the side resonator defined by reflectors 21 and 16 in FIG. 2, undesired modes are suppressed because of the lack of laser active material in this side resonator. In all other respects, the operation of the embodiment of FIG. 2 is like that described above for the embodiment of FIG. 1.

The invention is also applicable to lasers employing ring resonators. An example of this is shown in the embodiment of FIG. 3. In this embodiment the laser 61 includes the tube 62 including ionized argon as the active medium as in laser 11 of FIG. 1, the Brewster-angle windows 63 and 64 and the pumping apparatus including anode 65, cathode 66 and the D.C. power source 67. The laser 61 also includes the ring resonator comprising reflectors 68, 69 and 70 which are bicylindrically curved to maintain a circular cross-section of the desired mode as described in my copending application Ser. No. 465,135 filed June 18, 1965 and assigned to the assignee hereof.

In laser 61, employing an ionized active medium, there is a net drift velocity of the ions within the tube 62. This ion drift introduces a gain anisotropy which facilitates control of the direction of oscillation of the desired mode, for example, by techniques described in my copending application with T. J. Bridges, Ser. No. 465,135 filed June 18, 1965, and assigned to the assignee hereof. Thus, the embodiment of FIG. 3 can be employed to provide simultaneously the directional control described in the last-said copending application and the frequency control according to my present invention.

The mode selector 81 includes the reflecting elements 82 and 83 separated by about one inch of air or vacuum and mounted upon the quarter-wave plates 84 and 85 which are in turn mounted upon the piezoelectrically controlled mounting elements 86 and 87. The metallic annular mounts 88 and 89 support the piezoelectric mounts 86 and 87 respectively and provide a path through which the radiation can pass unattenuated. Control voltage source 90 applies a control voltage to the crystal quartz piezoelectric mounting elements 86 and 87 through suitable electrode means 91 and 92, the optic axes of the crystal quartz elements 86 and 87 being orthogonal to the laser axis. The path length of the primary resonator 68, 69 and 70 is about three meters and its free spectral range is about the same as that of the embodiment of FIG. 1.

The operation of the embodiment of FIG. 3 is substantially similar to that of FIG. 1, but with the added result that the oscillations in the desired mode tend to occur in one direction only within the ring resonator 68, 69, and 70, for the reason that it provides sufficient dispersion, as explained in my above-cited copending application with T. J. Bridges.

In the embodiments of FIGS. 1, 2 and 3, it may be seen that the polarization transformers are disposed on opposite sides of the secondary resonator or etalon. An alternative disposition of the polarization transformers is shown in the embodiment of FIG. 4.

In FIG. 4 the laser 101 includes the tube 102 having Brewster-angle windows 103 and 104 and containing a suitable active medium such as specified for the embodiments of FIGS. 1, 2 and 3, and further includes a primary resonator comprising the near semiconfocal reflectors 105 and 106. A secondary resonator is provided within the primary resonator by disposing another reflecting surface 107 in close proximity to one of the reflectors, for example, the planar reflector 106 of the primary resonator. The reflector 107 is planar to conform to a wave front of constant phase at its position and is mounted on one of the polarization transformers, i.e., quarter-wave plate 108. The quarter-wave plate 108 is mounted on piezoelectrically controllable elements 109 and a metallic mounting annulus 110 such as described above in the embodiment of FIG. 3.

Coupled to the piezoelectric mounting element 109 is the control voltage source 111 which is effective to change the spacing of reflector 107 from reflector 106. The second reflector 106 is similarly mounted on piezoelectrically controllable elements 113, which are in turn mounted on the metallic mounting annulus 114. Control source 111 is coupled to elements 113 through the amplifier 115, the gain of which is adjusted to make the percentage change in spacing of reflectors 105 and 106 equal to the percentage change in the spacing of reflectors 106 and 107. The piezoelectric effects in the two sets of elements 109, 113 must be opposite in sense The second polarization transformer is a quarter-wave plate 112 disposed within the secondary resonator 107, 106 and having its optic axis oriented parallel to a 45° polarization component of the selected mode, the optic axis of quarter-wave plate 108 being oriented parallel to the other 45° polarization component, as described above in connection with the embodiment of FIG. 1.

The primary difference in the operation in the embodiment of FIG. 4, as compared to the embodiment of FIG. 1, is that the second quarter-wave plate 112 provides the secondary resonator 106, 107 with two closely spaced different resonant frequencies, one for the polarization parallel to the optic axis of quarter-wave plate 112 and one for the polarization orthogonal to that optic axis. The difference of these frequencies is a result of the slightly different phase velocities of the two polarizations within quarter-wave plate 112. Nevertheless, for moderate ratios of the free spectral range, $C/2L$, of the secondary resonator 106, 107, to its pass band $\Delta f$, its two resonances will overlap closely and will not substantially affect the operation of the embodiment of FIG. 4 according to the principles of the present invention. As a practical matter, it is preferred that this ratio be greater than 10 and preferably about 100.

The same principles permit the employment of the invention in a ring resonator with one of the polarization transformers disposed within the secondary resonator.

For example, in the modified embodiment of FIG. 5, ring laser 131 includes the tube 132 containing the ionized argon active medium, the D.C. pumping apparatus including anode 135, cathode 136 and D.C. power supply 137, and the primary ring resonator comprising the four reflectors 138, 139, 140 and 141. The secondary resonator is provided in combination with the reflectors 140 and 141 by the reflecting element 142 which forms a relatively small ring resonator therein, and is partially transmissive with respect to the radiation resonant in the primary resonator. The primary and secondary resonators are simultaneously tuned in response to a control voltage from a source 143, which is applied to a piezoelectric control element 144 upon which the reflector 140 is mounted and which is also applied through amplifier 147 to a piezoelectric control element 134 upon which the reflector 139 is mounted.

The gain of amplifier 147 is adjusted to yield proportional changes in the path lengths of the primary and secondary resonators, as in FIG. 4. Although the gain amplifier 115 in FIG. 4 need be only slightly greater than unity, with polarity reversed, the gain of amplifier 147 in FIG. 5 must equal the ratio of the pathlengths, without polarity reversal. Such simultaneous tuning permits the use of this embodiment of the invention as a swept-tunable single-frequency oscillator.

The polarization transformer 145 is a quarter-wave plate disposed in the radiation path between reflectors 139 and 142 and having its optic axis at 45° with respect to the polarization passed by the Brewster-angle windows 148 and 149. Polarization transformer 146 is a quarter-wave plate identical to quarter-wave plate 145 and is disposed in the radiation path between reflectors 142 and 141 with its optic axis also at 45° with respect to the polarization passed by Brewster-angle windows 148 and 149. As in the other embodiments, the optic axis of quarter-wave plate 146 is parallel to the component of the polarization of the desired mode that passes through quarter-wave plate 145 orthogonal to the optic axis of the latter.

Radiation that is not simultaneously resonant in the primary resonator and the secondary resonator, but is resonant in the side resonator created by reflectors 138, 139 and 142, experiences a relative phase shift between its mutually orthogonal components of 180° for every two passes around that side resonator and experiences a total polarization transformation or rotation of 90° for those two passes. This undesired mode is therefore suppressed by the Brewster-angle windows 148 and 149, which act as polarizing elements.

My present invention is also readily adaptable to multiple sections of the active medium, a configuration that may have advantages in practical applications. For example, in FIG. 6, the laser 151 includes the tube 152 containing the selected active medium and the tube 153 containing the same active medium. Both tubes 152 and 153 have Brewster-angle windows adapted to pass the same polarization of radiation, which is simultaneously resonant in the primary resonator provided by reflectors 158 and 159 and the secondary resonator provided by reflectors 160 and 161. The reflectors 160 and 161 are mounted on the fused silica substrate 162 which is thermally coupled to and responsive to the thermal control source 164 as in the embodiments of FIGS. 1 and 2. Nevertheless, another secondary resonator of the types described herein could be employed instead of reflectors 160 and 161. Polarization transformers 165 and 166 are disposed on opposite sides of the secondary resonator and have optic axes which are parallel to mutually orthogonal polarization components of the polarization of the radiation passing through them in tandem, that is, the radiation simultaneously resonant and the primary resonator 158, 159 and the secondary resonator 160, 161.

A modification of the embodiment of FIG. 6 as applied to ring resonators is illustrated in FIG. 7 and is adapted to provide a secondary resonator with an extremely large free spectral range with respect to the primary resonator. That is, the primary resonator includes six reflectors 171, 172, 173, 174, 175 and 176, all reflecting the selected mode at oblique incidence, the reflectors 173 and 174 being faces of a fused silica crystal 178 which provide internal reflection therein and the reflectors 171, 172, 175 and 176 being bicylindrically curved to maintain a circular cross-section of the desired mode. The secondary resonator is a ring resonator comprising the partially transmissive coated surfaces 179 and 180 together with the internally reflecting surfaces 173 and 174 of fused silica prism 178. The surfaces 179 and 180 are surfaces upon which the angle of incidence is most acute and do not provide internal reflection, so that the Q of the secondary resonator is determined by the transmissivity of the reflective coating thereon. In contrast, the angles of incidence upon surfaces 173 and 174 are so obtuse that total internal reflection occurs.

By providing that the secondary resonator is a prism of material of sufficiently high index of refraction, I can make the secondary resonator very small compared to the primary resonator and can make its frequency discrimination extremely sharp. The polarization transformers employed therewith according to the principles of the present invention are the quarter-wave plates 181 and 182 and are disposed on opposite sides of the secondary resonator 178 with their respective optic axes parallel to mutually orthogonal polarization components of the desired mode of radiation that is simultaneously resonant both in the primary and secondary resonator. Further, their optic axes are oriented at 45° angles with respect to the polarization of that desired mode.

In all cases, the above-described arrangements are illustrative of the many possible specified embodiments that can represent applications of the principles of the invention. Numerous and varied other arrangements can be devised in accordance with these principles by those skilled in the art without departing from the spirit and scope of the invention.

What is claimed is:

1. A laser comprising an active medium, a first resonator including a pair of reflective elements disposed to provide a resonance axis extending through said active medium, said first resonator including means for selecting a polarization of radiation to be resonated, a second resonator disposed within said first resonator to provide a resonance axis aligned with the resonance axis of the first resonator, and a pair of polarization transformers disposed along said resonance axes to provide mutually compensating polarization transformations for a mode or radiation simultaneously resonant in the first and second resonators, each of said transformers providing cumulative polarization transformations for radiations not simultaneously resonant in said first and second resonators.

2. A laser according to claim 1 in which the polarization transformers comprise devices for producing a quarter-wavelength of relative phase retardation between two orthogonally polarized components of the radiation, said devices being oriented to provide opposite senses of said relative phase retardation for radiation propagated through said second resonator and through both of said devices.

3. A laser according to claim 2 in which the devices have respective optic axes oriented parallel to mutually orthogonal polarization components of the radiation propagated through the second resonator.

4. A laser according to claim 1 in which the polarization transformers are rotators.

5. A laser according to claim 4 in which each of the devices has means for producing therein a magnetic field having a direction with respect to the resonance axes that is opposite to the direction of the magnetic field produced in the other device with respect to the resonance axes.

6. A laser according to claim 1 in which the second resonator comprises a pair of reflecting surfaces joined to facing surfaces of the polarization transformers.

7. A laser according to claim 1 including means for simultaneously tuning the first and second resonators.

8. A laser according to claim 1 in which the active medium has an anisotropic gain characteristic, whereby the maximum gain in one direction therethrough and the maximum gain in the other direction therethrough occur at different frequencies, the first resonator being a ring resonator comprising a plurality of reflectors positioned to reflect the radiation at oblique incidence around a closed loop, the second resonator being disposed with a resonance axis aligned with the direction of propagation of radiation in said ring resonator and tuned to provide dispersion favoring oscillations propagating in only one direction through said active medium, said second resonator being positioned between the polarization transformers.

9. A laser according to claim 8 in which the first resonator is a ring resonator comprising a plurality of reflecting elements positioned to reflect the radiation at oblique incidence around a closed loop, the second resonator being aligned and coupled with the first resonator, the pair of polarization transformers being mutually oriented to transform the polarization of the selected mode in opposite senses as said mode propagates around the longest composite path provided by said first and second resonators.

10. A laser according to claim 1 in which the polarization transformers are disposed on opposite sides of the second resonator.

11. A laser according to claim 1 in which one of the polarization transformers is disposed within the second resonator.

12. A laser according to claim 1 in which the active medium includes at least two sections disposed along the axis of the first resonator and in which the second resonator and both polarization transformers are grouped between the two sections of the active medium.

13. A laser according to claim 1 in which the first resonator is a ring resonator including a plurality of reflecting elements providing reflection at oblique incidence and the active medium includes a plurality of sections each separated from another, and in which there is disposed in tandem one polarization transformer, the second resonator and the other polarization transformer along a radiation path between said two sections, the second resonator being a ring resonator.

14. A laser according to claim 13 in which the second resonator has entrance and exit surfaces that are partially reflective and obliquely disposed with respect to the radiation path at said surfaces, whereby two side ring resonators are formed, said first and second polarization transformers being disposed in different ones of said side resonators to suppress the modes naturally resonant therein.

15. A laser according to claim 1 in which the active medium has an anisotropic gain characteristic, whereby the maximum gain in one direction therethrough and the maximum gain in the other direction therethrough occur at different frequencies, the first resonator being a ring resonator comprising a plurality of reflectors positioned to reflect the radiation at oblique incidence around a closed loop, the second resonator being disposed with a resonance axis aligned with the direction of propagation of radiation in said ring resonator and tuned to provide dispersion favoring oscillations propagating in only one direction through said active medium, said second resonator being positioned to include one of said polarization transformers.

16. A laser comprising an active medium, a first resonator including a pair of reflective elements disposed to provide a resonance axis extending through said active medium, said first resonator including means for selecting a polarization of radiation to be resonated, a second resonator disposed within said first resonator to provide a resonance axis aligned with the resonance axis of the first resonator, said second resonator having a free spectral range greater than the oscillation band width of said active medium within said first resonator and having a pass band less than the free spectral range of the first resonator, and a pair of polarization transformers disposed along said resonance axes to provide mutually compensating polarization transformations for a mode of radiation simultaneously resonant in the first and second resonators, each of said transformers providing cumulative polarization transformations for radiations not simultaneously resonant in the first and second resonators.

17. A laser according to claim 16 in which each of the polarization transformers provides cumulative transformations for radiations not simultaneously resonant in the first and second resonators by amounts that make the total attenuation for the last said radiations greater than the gain provided by the active medium for the last-said radiations.

References Cited

UNITED STATES PATENTS 3,277,392   10/1966   Nicolai _____ 331—94.5
3,358,243   12/1967   Collins et al. _____ 331—94.5

OTHER REFERENCES

IBM Technical Disclosure Bulletin, "Laser Amplifier Having Interstage Isolation," J. W. Crowe, vol. 6 No. 9, February 1964, p. 96.

"Laser Experiments In-Cavity Modulation with Electro-Optic Crystals," proceedings of the IEEE, July 1964, p. 852.

RONALD L. WIBERT, Primary Examiner

V. P. McGRAW, Assistant Examiner

U.S. Cl. X.R.

350—157